US010336847B2

(12) United States Patent
Ahn et al.

(10) Patent No.: US 10,336,847 B2
(45) Date of Patent: Jul. 2, 2019

(54) VINYL CHLORIDE-BASED POLYMER, METHOD FOR PREPARING THE SAME, AND THERMOPLASTIC RESIN COMPOSITION CONTAINING THE SAME

(71) Applicant: LG CHEM, LTD., Seoul (KR)

(72) Inventors: Seong Yong Ahn, Daejeon (KR); Kun Ji Ki, Daejeon (KR); Se Woong Lee, Daejeon (KR); Seong Jae Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/512,771

(22) PCT Filed: Jun. 3, 2016

(86) PCT No.: PCT/KR2016/005946
§ 371 (c)(1),
(2) Date: Mar. 21, 2017

(87) PCT Pub. No.: WO2016/195436
PCT Pub. Date: Dec. 8, 2016

(65) Prior Publication Data
US 2017/0291974 A1    Oct. 12, 2017

(30) Foreign Application Priority Data

Jun. 5, 2015  (KR) .................. 10-2015-0080160

(51) Int. Cl.
| | | |
|---|---|---|
| *C08F 214/06* | (2006.01) | |
| *C08F 220/10* | (2006.01) | |
| *C08F 220/68* | (2006.01) | |
| *C08F 222/16* | (2006.01) | |
| *C08F 14/06* | (2006.01) | |
| *C08L 27/06* | (2006.01) | |
| *C08L 33/06* | (2006.01) | |
| *C08F 220/12* | (2006.01) | |
| *C08F 222/10* | (2006.01) | |

(52) U.S. Cl.
CPC ............ *C08F 214/06* (2013.01); *C08F 14/06* (2013.01); *C08F 222/16* (2013.01); *C08F 220/12* (2013.01); *C08F 220/68* (2013.01); *C08F 222/10* (2013.01); *C08F 2800/20* (2013.01); *C08L 27/06* (2013.01); *C08L 33/062* (2013.01)

(58) Field of Classification Search
None
See application file for complete search history.

(56) References Cited

U.S. PATENT DOCUMENTS

| | | | | |
|---|---|---|---|---|
| 2,897,169 A | * | 7/1959 | Dazzi .................... | C08L 27/06 524/308 |
| 3,219,729 A | * | 11/1965 | Meyers ............... | C09D 127/06 220/62.11 |
| 3,544,661 A | | 12/1970 | Oth | |
| 4,210,739 A | * | 7/1980 | Gallagher ............ | C08F 214/06 526/325 |
| 5,204,421 A | | 4/1993 | Amano et al. | |
| 7,001,960 B2 | * | 2/2006 | Ooura .................. | C08F 114/06 526/200 |
| 2007/0078217 A1 | | 4/2007 | Kim et al. | |

FOREIGN PATENT DOCUMENTS

| | | | |
|---|---|---|---|
| CN | 1117057 A | 2/1996 | |
| CN | 101263166 A | 9/2008 | |
| CN | 101338003 A | 1/2009 | |
| CN | 101386661 A * | 3/2009 | |
| CN | 101386661 A | 3/2009 | |
| CN | 104250335 A | 12/2014 | |
| DE | 2015917 A1 | 10/1971 | |
| EP | 22639 A1 * | 1/1982 | |
| GB | 765488 A | 1/1957 | |
| GB | 765488 A * | 1/1957 | ............ C08F 214/06 |
| GB | 1309320 A | 3/1973 | |
| JP | 02-269709 A | 11/1990 | |
| JP | 6-287237 A | 10/1994 | |
| KR | 2012-0024109 A | 3/2012 | |
| KR | 10-1133962 A | 4/2012 | |
| KR | 2012-0130412 A | 12/2012 | |
| KR | 10-2013-0001428 A | 1/2013 | |
| KR | 2014-0046584 A | 4/2014 | |

* cited by examiner

*Primary Examiner* — Richard A Huhn
(74) *Attorney, Agent, or Firm* — Dentons US LLP

(57) ABSTRACT

The present invention relates to a vinyl chloride-based polymer containing an unsaturated fatty acid ester at a specific ratio, a method for preparing the same, a thermoplastic resin composition containing the same, and a thermoplastic resin molded article produced from the composition. The vinyl chloride-based polymer may have good processability, and thus, the thermoplastic resin molded article produced from the thermoplastic resin composition containing the vinyl chloride-based polymer may have high impact strength and improved appearance characteristics.

16 Claims, No Drawings

VINYL CHLORIDE-BASED POLYMER, METHOD FOR PREPARING THE SAME, AND THERMOPLASTIC RESIN COMPOSITION CONTAINING THE SAME

CROSS-REFERENCE TO RELATED APPLICATIONS

This application is a National Stage Entry of International Application No. PCT/KR2016/005946, filed Jun. 3, 2016, and claims the benefit of and priority to Korean Application No. 10-2015-0080160, filed on Jun. 5, 2015, all of which are hereby incorporated by reference in their entirety for all purposes as if fully set forth herein.

TECHNICAL FIELD

The present invention relates to a vinyl chloride-based polymer containing an unsaturated fatty acid ester at a specific ratio, a method for preparing the same, a thermoplastic resin composition containing the same, and a thermoplastic resin molded article produced from the composition.

BACKGROUND ART

In general, vinyl chloride-based polymers contain at least 50% of vinyl chloride and are used in a variety of applications since they are inexpensive, easy to control hardness, and applicable to most processing apparatuses. Moreover, vinyl chloride-based polymers have excellent physical and chemical properties such as mechanical strength, weather resistance, and chemical resistance, and are thus being widely used in various fields such as building materials, household goods, automobile interior materials, and decorative materials. However, vinyl chloride-based polymers have various processing problems in that, for example, moldable temperature ranges are narrow due to processing temperatures close to the thermal decomposition temperatures thereof and it takes a long time to become a molten state.

To solve the above-mentioned problems, there are various known methods, such as adding a plasticizer to a vinyl chloride-based polymer, using a vinyl chloride-based copolymer of a vinyl chloride-based monomer and other monomers such as vinyl acetate, and using a blend of a vinyl chloride-based polymer and other resin components.

However, the above methods have problems in that it is difficult to improve the processability of vinyl chloride-based polymers while maintaining excellent physical properties and chemical properties inherent thereto. For example, adding a plasticizer to a vinyl chloride-based polymer or using a vinyl chloride-based copolymer of a vinyl chloride-based monomer and other monomers such as vinyl acetate significantly changes physical properties of molded articles.

In addition, the method in which other resin components are blended with a vinyl chloride-based polymer generally lowers the melt viscosity during molding process and thus lowers the processing temperature. Furthermore, kneading energy consumed by flows during the process results in insufficient gelation of a vinyl chloride-based polymer, which degrades physical properties compared to a sufficiently-gelled vinyl chloride-based polymer.

Meanwhile, in order to promote the gelation of a vinyl chloride-based polymer during molding process or improve the appearance of molded articles, a method in which a copolymer including methyl methacrylate-based as a main component is added to a vinyl chloride-based polymer has been proposed. This method has advantages in that the processability of a highly gelled vinyl chloride-based polymer can be improved while maintaining the mechanical properties and transparency of molded articles, and the generation of air marks can be prevented when a blend of the copolymer and a vinyl chloride-based polymer is molded into a sheet by calendering. However, this method has the problem of causing flow marks on the sheet surface and thus degrading the quality of molded articles.

Furthermore, appearance characteristics have been recently emphasized with the improvement of molding techniques or blending techniques, and there have been a growing demand for developing techniques capable of preventing the generation of fish-eyes and improving transparency.

For example, U.S. Pat. No. 5,204,421 discloses a preparation method in which a dispersant having a degree of hydration of 20-55% is added in installments in the initial stage and the middle stage of polymerization, and indicates that a vinyl chloride polymer having excellent plasticizer absorption and a small number of fish-eyes can be prepared through the preparation method. U.S. Pat. No. 7,001,960 discloses a preparation method in which a dispersant having a degree of hydration of 20-57% is continuously added from the initial stage of polymerization to the middle stage of polymerization, and indicates that a vinyl chloride polymer having a small number of fish-eyes can be prepared through the preparation method. Korean patent publication No. 2013-0001428 discloses a method for suppressing the formation of scale in a polymerization reactor and thus preventing the generation of fish-eyes by adding a metal deactivator during a polymerization reaction. However, the above conventional methods have a negligible effect on the reduction of fish-eyes and cannot significantly improve the transparency of produced molded articles.

Therefore, in order to easily apply a vinyl chloride-based polymer to various fields, it is necessary to develop a technique capable of improving the processability of the vinyl chloride-based polymer such that the generation of fish-eyes can be suppressed and the appearance characteristics of produced molded articles can thus be improved.

DISCLOSURE OF THE INVENTION

Technical Problem

The present invention has been devised in consideration of the above-mentioned problems, and the object of the present invention is to provide a vinyl chloride-based polymer containing an unsaturated fatty acid ester at a specific ratio.

Another object of the present invention is to provide a method for preparing the vinyl chloride-based polymer.

Still another object of the present invention is to provide a thermoplastic resin composition containing the vinyl chloride-based polymer.

In addition, still another object of the present invention is to provide a thermoplastic resin molded article produced from the thermoplastic resin composition.

Technical Solution

To solve the above-described tasks, the present invention provides a vinyl chloride-based polymer containing 0.001 parts by weight or more and less than 2 parts by weight of an unsaturated fatty acid ester on the basis of 100 parts by weight of the vinyl chloride-based polymer.

In addition, the present invention provides a method for preparing the vinyl chloride-based polymer including adding an unsaturated fatty acid ester to a vinyl chloride-based monomer in the presence of a polymerization initiator and a protective colloid auxiliary and performing suspension polymerization (step A), wherein the unsaturated fatty acid ester is batch-added, continuously added, or added in at least two installments, in a range in which the polymerization conversion rate is 85% or less.

In addition, the present invention provides a thermoplastic resin composition containing the vinyl chloride-based polymer.

Furthermore, the present invention provides a thermoplastic resin molded article produced from the thermoplastic resin composition.

Advantageous Effects

A vinyl chloride-based polymer according to the present invention contains an unsaturated fatty acid ester at a specific ratio, for example, 0.001 parts by weight or more and less than 2 parts by weight, and the processability thereof can be improved due to the action of an internal plasticizer of the unsaturated fatty acid ester.

In addition, by using a method for preparing the vinyl chloride-based polymer according to the present invention, the unsaturated fatty acid ester can be stably distributed in the vinyl chloride-based polymer, and the polymerization conversion rate to a vinyl chloride-based polymer can be increased.

Furthermore, a thermoplastic resin molded article produced from a thermoplastic resin composition containing the vinyl chloride-based polymer according to the present invention can have excellent impact strength, a small number of fish-eyes, and excellent appearance characteristics.

Therefore, the vinyl chloride-based polymer according to the present invention and the method for preparing the same can be easily applied to industries as needed, in particular, industries using vinyl chloride-based resins.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a vinyl chloride-based polymer which has excellent processability and thus is capable of providing molded articles having a small number of fish-eyes and excellent appearance characteristics.

The vinyl chloride-based polymer according to an embodiment of the present invention is characterized by containing 0.001 parts by weight or more and less than 2 parts by weight of an unsaturated fatty acid ester on the basis of 100 parts by weight of the vinyl chloride-based polymer.

The terms "vinyl chloride-based polymer" in the present disclosure comprehensively means a material produced by polymerizing a vinyl chloride-based monomer, and may be in a state in which vinyl chloride-based monomer-derived polymer chains and unsaturated fatty acid esters are mixed. Here, the meaning of "mixed" includes a mixture state, a bonded state, relationship between a continuous phase and a discontinuous phase, and the like.

The vinyl chloride-based polymer according to an embodiment of the present invention may be a polymer prepared by a method described below using only vinyl chloride monomer as a monomer component. However, as necessary, the vinyl chloride-based polymer may be a copolymer prepared using, as monomer components, a vinyl chloride monomer as a main component, together with a vinyl-based monomer which is copolymerizable with the vinyl chloride monomer. When the vinyl chloride-based polymer is a copolymer of a vinyl chloride monomer and a vinyl-based monomer, the content of vinyl chloride in the copolymer may be 50% or more.

Examples of vinyl-based monomers copolymerizable with the vinyl chloride-based monomer may include, but not limited to, olefin compounds such as ethylene, propylene and butene; vinyl esters such as vinyl acetate, vinyl propionate and vinyl stearate; unsaturated nitriles such as acrylonitrile; vinyl alkyl ethers such as vinyl methyl ether, vinyl ethyl ether, vinyl octyl ether and vinyl lauryl ether; vinylidene halides such as vinylidene chloride; unsaturated fatty acids such as acrylic acid, methacrylic acid, itaconic acid, maleic acid, fumaric acid, maleic anhydride and itaconic anhydride, and anhydrides of these fatty acids; unsaturated fatty acid esters such as methyl acrylate, ethyl acrylate, monomethyl maleate, dimethyl maleate and butyl benzyl maleate; and crosslinkable monomers such as diallyl phthalate, and the above-mentioned vinyl-based monomers may be used alone or as a mixture of two or more thereof.

The unsaturated fatty acid ester included in the vinyl chloride-based polymer according to an embodiment of the present invention may be a substance produced by esterification of an unsaturated fatty acid with an alcohol, and the unsaturated fatty acid may be a compound having at least one carbon-carbon double bond. The unsaturated fatty acid ester may act as an internal plasticizer and thus serve to improve the processability of the vinyl chloride-based polymer containing the unsaturated fatty acid ester.

Particularly, the unsaturated fatty acid ester may be an unsaturated carboxylic acid ester having 2-16 carbon atoms, and may include cis- and trans-isomers of unsaturated fatty acid ester. The weight ratio between the cis- and trans-isomers of unsaturated fatty acid ester may be 60:40 to 90:10. More particularly, the weight ratio between the cis- and trans-isomers of unsaturated fatty acid ester may be 65:35 to 80:20. When the weight ratio between the cis- and trans-isomers of unsaturated fatty acid ester deviates from the above range, the processability of a vinyl chloride-based polymer containing the unsaturated fatty acid ester may be deteriorated, thus deteriorating the appearance characteristics of thermoplastic resin molded articles produced from thermoplastic resin compositions containing the vinyl chloride-based polymer.

The cis-isomer of unsaturated fatty acid ester may be a compound represented by Formula 1 below, and the trans-isomer of unsaturated fatty acid ester may be a compound represented by Formula 2 below.

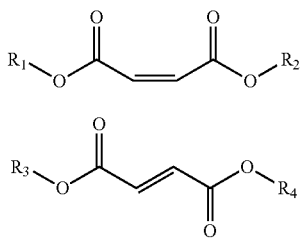

[Formula 1]

[Formula 2]

In Formula 1 or Formula 2, $R_1$ to $R_4$ may be each independently selected from the group consisting of an alkyl group having 2 to 16 carbon atoms, a cycloalkyl group having 3 to 16 carbon atoms, and the combination thereof.

In the present disclosure, unless otherwise specified, "the combination thereof" may mean that two or more functional groups are bonded by a single bond, a double bond (ethylene group), a triple bond (acetylene group) or through a linker such as an alkylene group having 2 to 16 carbon atoms (for example, a methylene group (—$CH_2$—) or an ethylene group (—$CH_2CH_2$—), etc.), or two or more functional groups linked by condensation.

Particularly, in Formula 1 or Formula 2, $R_1$ to $R_4$ may be each independently a linear or branched alkyl group having 4 to 14 carbon atoms.

In the present disclosure, the terms "alkyl group" may refer to a remaining atomic group excluding one hydrogen atom in a saturated hydrocarbon chain.

The unsaturated fatty acid ester according to an embodiment of the present invention may be included in the vinyl chloride-based polymer in an amount of 0.001 parts by weight or more and less than 2 parts by weight as described above. In the case where the amount of the unsaturated fatty acid ester included is less than 0.001 parts by weight, the action as an internal plasticizer may not be properly exhibited, and the processability of the vinyl chloride-based polymer containing thereof may not be improved. In the case where the amount of the unsaturated fatty acid ester is 2 parts by weight or more, antiplasticization phenomenon may occur, and the impact strength of a thermoplastic resin molded article which is produced using the vinyl chloride-based polymer may be deteriorated or the surface properties thereof may be suppressed even the processability of the vinyl chloride-based polymer containing thereof may be somewhat improved.

Since the vinyl chloride polymer according to the present invention includes an unsaturated fatty acid ester which may act as an internal plasticizer at a specific ratio, processability may be improved due to the unsaturated fatty acid ester.

In addition, a method for preparing the vinyl chloride-based polymer is provided in the present invention.

A method for preparing a vinyl chloride-based polymer according to an embodiment of the present invention includes adding an unsaturated fatty acid ester to a vinyl chloride-based monomer in the presence of a polymerization initiator and a protective colloid auxiliary and performing suspension polymerization (step A), wherein the unsaturated fatty acid ester is batch-added, continuously added, or added in at least two installments, in a range in which the polymerization conversion rate is 85% or less.

Step A is a step for producing a vinyl chloride-based polymer containing an unsaturated fatty acid ester at a specific ratio and can be performed by adding an unsaturated fatty acid ester to a vinyl chloride-based monomer and polymerizing.

In particular, step A may be performed by adding an unsaturated fatty acid ester mixture to a polymerization reactor provided with a vinyl chloride-based monomer and then performing suspension polymerization. In this case, the polymerization reactor may be a filled-reactor with a solvent, a polymerization initiator and a protective colloid auxiliary prior to providing the vinyl chloride-based monomer. The "filled-reactor" may mean a reactor in a state in which a solvent, a polymerization initiator and a protective colloid auxiliary are added prior to providing the vinyl chloride-based monomer.

The vinyl chloride-based monomer may be pure vinyl chloride-based monomer alone. In addition, the vinyl chloride-based monomer may be a combination of a vinyl chloride monomer and a vinyl-based monomer copolymerizable therewith according to the objective. When the vinyl chloride-based monomer is the combination of a vinyl chloride monomer and a vinyl-based monomer, the amount of the vinyl chloride may be controlled so as to be 50 wt % or more in the vinyl chloride-based polymer finally prepared. The vinyl-based monomer copolymerizable with the vinyl chloride monomer may be the same as described above.

The unsaturated fatty acid ester is added during polymerization of a vinyl chloride-based monomer and is included in a vinyl chloride-based polymer finally prepared at a specific ratio to serve the improvement of the processability of the vinyl chloride-based polymer, and may include cis- and trans-isomers of unsaturated fatty acid ester as described above. The weight ratio between the cis- and trans-isomers of unsaturated fatty acid ester may be 60:40 to 90:10. More particularly, the weight ratio between the cis- and trans-isomers of unsaturated fatty acid ester may be 65:35 to 80:20. Specific examples of the unsaturated fatty acid ester may be the same as described above.

In addition, the amount of the unsaturated fatty acid ester may be 0.001 parts by weight or more and less than 2 parts by weight on the basis of 100 parts by weight of the vinyl chloride-based monomer. In the case where the amount used of the unsaturated fatty acid ester is less than 0.001 parts by weight, the improvement effect of processability of the vinyl chloride-based polymer finally prepared may not be attained or may be trivial, and in the case where the amount is 2 parts by weight or more, the processability of the vinyl chloride-based polymer finally prepared may be somewhat improved, but the impact strength of a molded article using thereof may be deteriorated and the surface properties thereof may be degraded.

The unsaturated fatty acid ester may be batch-added, continuously added, or added in at least two installments to a polymerization reactor provided with a vinyl chloride-based monomer in a range in which the polymerization conversion rate is 85% or less as described above.

In the present invention, the "polymerization conversion rate" may mean conversion rate of a vinyl chloride-based monomer to a polymer and may be measured by using a butane tracer equipped with gas chromatography. Specifically, a polymerization conversion curve according to the ratio of the vinyl chloride-based monomer to butane with time under predetermined polymerization conditions is drawn for each polymerization condition, and the polymerization conversion rate according to each polymerization condition may be measured on the basis of the curve. Also, the polymerization conversion rate may include a tolerance of the measurement, and, for example, may include up to ±3% from 85%.

The batch addition may be addition of an unsaturated fatty acid ester which is used at one point in the above-described range of the polymerization conversion rate to a polymerization reactor provided with a vinyl chloride-based monomer at a time. In particular, the batch addition may be addition of the entire amount of the unsaturated fatty acid ester in a range of the polymerization conversion rate of 60% or less at a time.

The continuous addition may be addition of an unsaturated fatty acid ester continuously to a polymerization reactor provided with a vinyl chloride-based monomer in a range of the polymerization conversion rate of 85% or less, and in particular, may be performed in such a manner that the addition of the unsaturated fatty acid ester is started when the polymerization conversion rate is 1% or more, and the addition is ended when the polymerization conversion rate is 85% or less. The addition may be performed in such a manner that an entire amount of the unsaturated fatty acid ester is added at a constant rate from the start to the end of the addition. Here, the polymerization conversion rate of 1% may denote the reaching time of a polymerization initiation temperature, and that is, the unsaturated fatty acid ester may be added immediately after the start of polymerization or simultaneously with the start of polymerization. In addition, the polymerization conversion rate of 85% may denote the end time of polymerization and may include up to the termination time of reaction.

More particularly, the continuous addition may be performed in such a manner that the addition is started when the polymerization conversion rate is 10% or more, and the addition is ended when the polymerization conversion rate is 35% or less, and the entire amount of the unsaturated fatty acid ester used may be added at a constant rate from the start to the end of the addition.

The addition in installments may denote continuous addition in installments or batch addition in installments. The continuous addition in installments may be continuous addition of an unsaturated fatty acid ester after dividing thereof in two or more parts in a range of a specific polymerization conversion rate, and the batch addition in installments may be addition at a time at a specific polymerization conversion rate after dividing an unsaturated fatty acid ester in two or more parts.

In particular, the continuous addition in installments may include a first continuous addition in which the addition of a first fraction of the entire amount of the unsaturated fatty acid ester is started at the time when the polymerization conversion rate is 1% or more and is ended at the time when the polymerization conversion rate is 25% or less, and a second continuous addition in which the addition of a second fraction which corresponds to the entire amount excluding the first fraction is started at the time when the polymerization conversion rate is 35% or more and is ended at the time when the polymerization conversion rate is 60% or less. In this case, each of the first continuous addition and the second continuous addition may be performed by continuously adding the unsaturated fatty acid ester at a constant rate from the start to the end of the addition.

Also, the batch addition in installments may be performed in such a manner that a first fraction of the entire amount of the unsaturated fatty acid ester is primarily added when the polymerization conversion rate is in a range of 1% to 30%, and a remaining second fraction excluding the first fraction, of the entire amount of the unsaturated fatty acid ester is secondarily added when the polymerization conversion rate is in a range of 35% to 85%.

In this case, the first fraction and the second fraction may be adjusted to be divided into a weight ratio of 9:1 to 1:9, and the addition in installments may be performed by a number of at least two times, three times, and four times. Fractions may be formed in a number equal to the number of times of the additions, and each fraction may be adjusted to have an appropriate ratio depending on the purpose.

In particular, in the case where the addition in installments is continuous addition in installments or batch addition in installments in three times, the continuous addition in installments may include a first continuous addition in which the addition of a first fraction of the entire amount of the unsaturated fatty acid ester is started at the time when the polymerization conversion rate is 1% or more and is ended at the time when the polymerization conversion rate is 25% or less, a second continuous addition in which the addition of a second fraction of the entire amount is started at the time when the polymerization conversion rate is 30% or more and is ended at the time when the polymerization conversion rate is 50% or less, and a third continuous addition in which the addition of a third fraction of the entire amount excluding the first fraction and the second fraction is started at the time when the polymerization conversion rate is 55% or more and is ended at the time when the polymerization conversion rate is 70% or less. In this case, each of the first continuous addition, the second continuous addition, and the third continuous addition may be performed by adding the unsaturated fatty acid ester from the start to the end of the addition at a constant rate.

Also, the batch addition in installments may be performed in such a manner that a first fraction of the entire amount of the unsaturated fatty acid ester is primarily added when the polymerization conversion rate is in a range of 10% to 30%, a second fraction of the entire amount is secondarily added when the polymerization conversion rate is in a range of 35% to 50%, and a remaining third fraction excluding the first fraction and the second fraction, of the entire amount is thirdly added when the polymerization conversion rate is in a range of 55% to 85%.

The protective colloid auxiliary functions to stabilize reactants during polymerization and allows the production of uniform and stable particles, wherein the protective colloid auxiliary may be used in an amount of 0.03 parts by weight to 5 parts by weight on the basis of 100 parts by weight of the vinyl chloride-based monomer that is used in the polymerization. Specifically, the protective colloid auxiliary may be used in an amount of 0.05 parts by weight to 2.5 parts by weight on the basis of 100 parts by weight of the vinyl chloride-based monomer. If the protective colloid auxiliary is used in an amount of less than 0.03 parts by weight, the particle size of the vinyl chloride-based polymer finally prepared increases excessively, and fish-eyes may be generated in a molded article manufactured using the vinyl chloride-based polymer. In the case where the protective colloid auxiliary is used in an amount of greater than 5 parts by weight, initial colorability of a molded article manufactured using the vinyl chloride-based polymer may be deteriorated due to the increase of fine particles in the vinyl chloride-based polymer finally prepared.

The protective colloid auxiliary may be one selected from the group consisting of a vinyl alcohol-based resin, cellulose, and an unsaturated organic acid polymer, or a mixture of two thereof, and, specifically, the protective colloid auxiliary may be a mixture in which the vinyl alcohol-based resin and the cellulose are mixed in a weight ratio of 5:1 to 9:7. In this case, the vinyl alcohol-based resin may be a mixture in which a first polyvinyl alcohol having a degree of hydration of greater than 50 wt % and 90 wt % and less, and a second polyvinyl alcohol having a degree of hydration of 30 wt % to 50 wt % are mixed in a weight ratio of 2:1 to 1:2.

Furthermore, the cellulose may include methyl cellulose, hydroxyethyl cellulose, or hydroxypropylmethyl cellulose, and any one thereof or a mixture of two or more thereof may be used. Among these, the cellulose may be hydroxypropylmethyl cellulose and more particularly, an amount of a hydroxypropyl group in the molecule may be in a range of 3 wt % to 20 wt % and viscosity of 2% aqueous solution at 23±5° C. may be in a range of 10 cps to 20,000 cps.

Also, the unsaturated organic acid polymer may include an acrylic acid polymer, a methacrylic acid polymer, an itaconic acid polymer, a fumaric acid polymer, a maleic acid polymer, or a succinic acid polymer, and any one thereof or a mixture of two or more thereof may be used.

The polymerization initiator may be used in an amount of 0.02 parts by weight to 0.2 parts by weight on the basis of 100 parts by weight of the vinyl chloride-based monomer that is used in the polymerization. Specifically, the polymerization initiator may be used in an amount of 0.04 parts by weight to 0.12 parts by weight on the basis of 100 parts by weight of the vinyl chloride-based monomer. If the amount of the polymerization initiator is less than 0.02 parts by weight, polymerization reaction time may be increased and the conversion rate to the vinyl chloride-based polymer may be decreased, thereby decreasing the productivity. If the amount of the polymerization initiator is greater than 0.2 parts by weight, the polymerization initiator may not be completely consumed during the polymerization but may remain in the vinyl chloride-based polymer finally prepared, thereby causing worry on the decrease of physical properties, particularly thermal stability of the polymer.

The polymerization initiator is not particularly limited, but may include, for example, a peroxide-based compound such as dicumyl peroxide, dipentyl peroxide, di-3,5,5-trimethyl hexanoyl peroxide, and dilauryl peroxide; a peroxydicarbonate-based compound such as diisopropyl peroxydicarbonate, di-sec-butyl peroxydicarbonate, and di-2-ethylhexyl peroxydicarbonate; a peroxyester-based compound such as t-butyl peroxypivalate, 1,1,3,3-tetramethylbutyl peroxyneodecanoate, and t-butyl peroxyneodecanoate; an azo-based compound such as azobis-2,4-dimethylvaleronitrile; a hydroperoxide-based compound such as t-butyl hydroperoxide; or a sulfate-based compound such as potassium persulfate and ammonium persulfate, and any one thereof or a mixture of two or more thereof may be used.

The suspension polymerization is not specifically limited, but, for example, may be performed in a temperature range of 30° C. to 70° C., and the temperature during the suspension polymerization may be appropriately adjusted within the above temperature range according to the desired degree of polymerization. For example, the higher the desired degree of polymerization is, the lower the temperature may be, and the lower the desired degree of polymerization is, the higher the temperature may be.

In the suspension polymerization, polymerization may be ended by adding a reaction terminator, and the end point may be a point at which a pressure in the reactor is in a range of 6 kg/cm$^2$ to 8 kg/cm$^2$ (or a point at which the polymerization conversion rate is greater than 85%).

The reaction terminator is not particularly limited, but may include, for example, a phenolic compound, an amine compound, a nitrile compound, or a sulfur compound. Specifically, the reaction terminator may be at least one selected from the group consisting of a phenolic compound such as triethylene glycol-bis-3-(3-t-butyl-4-hydroxy-5-methylphenyl)propionate, hydroquinone, p-methoxy phenol, t-butyl hydroxyanisole, n-octadecyl-3-(4-hydroxy-3,5-di-t-butylphenyl)propionate, 2,5-di-t-butylhydroquinone, 4,4'-butylidenebis(3-methyl-6-t-butylphenol), t-butyl catechol, 4,4'-thiobis(6-t-butyl-m-cresol), and tocopherol, an amine compound such as N,N'-diphenyl-p-phenylenediamine and 4,4'-bis(dimethylbenzyl)diphenylamine, a nitrile compound such as 2-phenyl nitronyl nitroxide, 3-imidazoline nitroxide, and 4-hydroxy-2,2',6,6'-tetramethyl-piperidine-1-oxyl, and a sulfur compound such as dodecyl mercaptan and 1,2-diphenyl-2-thiol.

In addition, in the suspension polymerization, a solvent may be used, and the solvent may be deionized water. The amount of the solvent may be appropriately controlled according to the amount of the vinyl chloride-based monomer used in polymerization and the size of a polymerization reactor. For example, the solvent may be used in an amount of 70 parts by weight or more on the basis of 100 parts by weight of the vinyl chloride-based monomer.

Also, in the suspension polymerization, an additive such as a polymerization regulator, a chain transfer agent, a pH adjuster, an antioxidant, a cross-linking agent, an antistatic agent, a scale inhibitor, and a surfactant, may be further added as needed in addition to the above-described active ingredients, and type and amount of the additive are not particularly limited and the type and amount known in the art may be used. The additive may be added at any point, for example, at the starting of the suspension polymerization, in the middle of the polymerization, or after the polymerization, and may be added in batches or continuously.

The preparation method according to the present invention may further include drying after the step A, and the drying is not particularly limited and may be performed by a method known in the art.

In addition, the present invention provides a thermoplastic resin composition including the vinyl chloride-based polymer.

The thermoplastic resin composition according to an embodiment of the present invention may include the vinyl chloride-based polymer which contains an unsaturated fatty acid ester at a specific ratio as a main component. That is, the thermoplastic resin composition may include 90 wt % or more, particularly, 95 wt % or more of the vinyl chloride-based polymer on the basis of 100 wt % of the composition.

Also, the thermoplastic resin composition may include various additives according to an object to produce, for example, the use of a thermoplastic resin molded article. The additive is not specifically limited, but may include a plasticizer, a stabilizer, a lubricant, an impact reinforcing agent, a processing assistant agent, a pigment, etc.

Further, the present invention provides a thermoplastic resin molded article manufactured from the thermoplastic resin composition.

A thermoplastic resin molded article according to an embodiment of the present invention is produced from a thermoplastic resin composition containing a vinyl chloride-based polymer according to the present invention, and may have excellent impact strength, a small number of fish-eyes, and excellent transparency.

Hereinafter, the present invention will be described in more detail, according to specific examples and experimental examples. However, the following examples and experimental examples are merely presented to exemplify the present invention, and the scope of the present invention is not limited thereto.

When preparing vinyl chloride-based polymers of the following examples and comparative examples, polymerization conversion rate was measured using a butane tracer equipped with gas chromatography. Specifically, a polymerization conversion curve according to the ratio of the vinyl chloride-based monomer to butane with time under predetermined polymerization conditions was drawn for each polymerization condition, and the polymerization conversion rate according to each polymerization condition was measured on the basis of the curve.

Example 1

390 kg of deionized water was added to a reactor having an internal volume of 1 m$^3$ and equipped with a reflux condenser, 150 g of polyvinyl alcohol having a degree of hydration of 80.5%, 120 g of polyvinyl alcohol having a degree of hydration of 42.3%, and 30 g of hydroxypropylmethyl cellulose were added to the reactor, and 300 kg of a vinyl chloride monomer was added thereto. Then, 60 g of di-2-ethylhexyl peroxydicarbonate and 120 g of t-butyl peroxyneodecanoate were added to initiate the reaction. When a polymerization conversion rate was 20%, di(2-ethylhexyl)ester started to be added to the reactor and the addition was ended when the polymerization conversion rate was 35%. The di(2-ethylhexyl)ester added was 3 g in total and was a mixture of di(2-ethylhexyl)maleate and di(2-ethylhexyl)fumarate in a weight ratio of 90:10. In order to achieve an average degree of polymerization of 1,000, the reaction temperature was maintained at 57° C. during the entire process of the polymerization reaction, and, when an internal pressure of the reactor for polymerization reached 6.3 kg/cm$^2$, 12 g of 4-hydroxy-2,2,6,6-tetramethyl-piperidine-1-oxyl and 90 g of triethylene glycol-bis-3-(3-t-butyl-4-hydroxy-5-methylphenyl)propionate were added to terminate the reaction. Thereafter, an unreacted monomer and a vinyl chloride-based copolymer slurry generated were separated from each other and recovered, and the vinyl chloride-based copolymer slurry was dried in a fluidized bed dryer to obtain a vinyl chloride-based polymer.

Example 2

A vinyl chloride-based polymer was produced by the same method described in Example 1 except for increasing the amount added of di(2-ethylhexyl)ester to 1,500 g.

Example 3

A vinyl chloride-based polymer was produced by the same method described in Example 1 except for increasing the amount added of di(2-ethylhexyl)ester to 4,500 g.

Example 4

A vinyl chloride-based polymer was produced by the same method described in Example 1 except for using a mixture of di(2-ethylhexyl)maleate and di(2-ethylhexyl)fumarate in a weight ratio of 80:20 instead of di(2-ethylhexyl)ester.

Example 5

A vinyl chloride-based polymer was produced by the same method described in Example 1 except for using a mixture of di(2-ethylhexyl)maleate and di(2-ethylhexyl)fumarate in a weight ratio of 65:35 instead of di(2-ethylhexyl)ester.

Example 6

A vinyl chloride-based polymer was produced by the same method described in Example 2 except for using di(ethyldodecyl)ester instead of di(2-ethylhexyl)ester. The di(ethyldodecyl)ester was a mixture of di(ethyldodecyl)maleate and di(ethyldodecyl)fumarate in a weight ratio of 90:10.

Example 7

A vinyl chloride-based polymer was produced by the same method described in Example 1 except for using 150 g of dihexyl ester together with the vinyl chloride-based monomer in batch instead of di(2-ethylhexyl)ester. The dihexyl ester was a mixture of dihexyl maleate and dihexyl fumarate in a weight ratio of 90:10.

Example 8

A vinyl chloride-based polymer was produced by the same method described in Example 1 except for adding 100 g of di(2-ethylhexyl)ester in batch at a point when polymerization conversion rate was 10%.

Example 9

A vinyl chloride-based polymer was produced by the same method described in Example 1 except for using dibutyl ester instead of di(2-ethylhexyl)ester, primarily adding 500 g of the dibutyl ester in batch at a point when polymerization conversion rate was 15% and continuing polymerization, and secondly adding 500 g of the dibutyl ester in batch at a point when polymerization conversion rate was 40%. The dibutyl ester was a mixture of dibutyl maleate and dibutyl fumarate in a weight ratio of 90:10.

Example 10

A vinyl chloride-based polymer was produced by the same method described in Example 1 except for using didecyl ester instead of di(2-ethylhexyl)ester, primarily adding 1,000 g of the didecyl ester continuously in a way that the addition started at a point when polymerization conversion rate was 15% and the addition was ended at a point when polymerization conversion rate was 20%, and secondly adding 1,000 g of the didecyl ester continuously in a way that the addition started at a point when polymerization conversion rate was 30% and the addition was ended at a point when polymerization conversion rate was 40%. The didecyl ester was a mixture of didecyl maleate and didecyl fumarate in a weight ratio of 90:10.

Example 11

A vinyl chloride-based polymer was produced by the same method described in Example 1 except for primarily adding 500 g of the di(2-ethylhexyl)ester in batch at a point when polymerization conversion rate was 20% and continuing polymerization, secondly adding 500 g of di(2-ethylhexyl)ester in batch at a point when polymerization conversion rate was 40% and continuing polymerization, and thirdly adding 500 g of di(2-ethylhexyl)ester in batch at a point when polymerization conversion rate was 60%. All the di(2-ethylhexyl)esters added in the first, second and third batch were a mixture of di(2-ethylhexyl)maleate and di(2-ethylhexyl)fumarate in a weight ratio of 90:10.

Example 12

390 kg of deionized water was added to a reactor having an internal volume of 1 m³ and equipped with a reflux condenser, 150 g of polyvinyl alcohol having a degree of hydration of 80.5%, 120 g of polyvinyl alcohol having a degree of hydration of 42.3%, and 30 g of hydroxypropyl-methyl cellulose were added to the reactor, and 300 kg of a vinyl chloride monomer was added thereto. Then, 60 g of di-2-ethylhexyl peroxydicarbonate and 150 g of t-butyl peroxyneodecanoate were added to initiate the reaction. When a polymerization conversion rate was 80%, 50 g of di(2-ethylhexyl)ester was added in batch. The di(2-ethylhexyl)ester was a mixture of di(2-ethylhexyl)maleate and di(2-ethylhexyl)fumarate in a weight ratio of 90:10. In order to achieve an average degree of polymerization of 800, the reaction temperature was maintained at 64° C. during an entire process of the polymerization reaction, and when an internal pressure of the reactor reached 8.0 kg/cm², 12 g of 4-hydroxy-2,2,6,6-tetramethyl-piperidine-1-oxyl and 90 g of triethylene glycol-bis-3-(3-t-butyl-4-hydroxy-5-methyl-phenyl)propionate were added to terminate the reaction. Thereafter, an unreacted monomer and a vinyl chloride-based copolymer slurry generated were separated from each other and recovered, and the vinyl chloride-based copolymer slurry was dried in a fluidized bed dryer to obtain a vinyl chloride-based polymer.

Example 13

A vinyl chloride-based polymer was produced by the same method described in Example 12 except for adding 300 g of dibutylester instead of di(2-ethylhexyl)ester in a way that the addition started at a point when polymerization conversion rate was 50% and the addition was ended at a point when polymerization conversion rate was 60%.

Example 14

A vinyl chloride-based polymer was produced by the same method described in Example 12 except for adding 500 g of didecylester instead of di(2-ethylhexyl)ester in a way that the addition started at a point when polymerization conversion rate was 15% and the addition was ended at a point when polymerization conversion rate was 30%. The didecyl ester was a mixture of didecyl maleate and didecyl fumarate in a weight ratio of 90:10.

Example 15

A vinyl chloride-based polymer was produced by the same method described in Example 12 except for primarily adding 200 g of di(2-ethylhexyl)ester continuously in a way that the addition started at a point when polymerization conversion rate was 15% and the addition was ended at a point when polymerization conversion rate was 25% and continuing polymerization, secondly adding 200 g of di(2-ethylhexyl)ester continuously in a way that the addition started at a point when polymerization conversion rate was 35% and the addition was ended at a point when polymerization conversion rate was 45% and continuing polymerization, and additionally adding 200 g of di(2-ethylhexyl) ester continuously in a way that the addition started at a point when polymerization conversion rate was 55% and the addition was ended at a point when polymerization conversion rate was 70%. The di(2-ethylhexyl)ester was a mixture of di(2-ethylhexyl)maleate and di(2-ethylhexyl)fumarate in a weight ratio of 90:10.

Comparative Example 1

A vinyl chloride-based polymer was produced by the same method described in Example 1 except for not using di(2-ethylhexyl) ester.

Comparative Example 2

A vinyl chloride-based polymer was produced by the same method described in Example 1 except for adding 2.5 g of di(2-ethylhexyl)ester.

Comparative Example 3

A vinyl chloride-based polymer was produced by the same method described in Example 1 except for increasing the amount added of di(2-ethylhexyl)ester to 7,500 g.

Comparative Example 4

A vinyl chloride-based polymer was produced by the same method described in Example 1 except for using a mixture of di(2-ethylhexyl)maleate and di(2-ethylhexyl)fumarate in a weight ratio of 95:5 as di(2-ethylhexyl)ester.

Comparative Example 5

A vinyl chloride-based polymer was produced by the same method described in Example 1 except for using a mixture of di(2-ethylhexyl)maleate and di(2-ethylhexyl)fumarate in a weight ratio of 50:50 as di(2-ethylhexyl)ester.

Comparative Example 6

A vinyl chloride-based polymer was produced by the same method described in Example 6 except for using di(octadecyl)ester instead of the di(2-ethylhexyl)ester. The di(octadecyl)ester was a mixture of di(octadecyl)maleate and di(octadecyl)fumarate in a weight ratio of 90:10.

Comparative Example 7

A vinyl chloride-based polymer was produced by the same method described in Example 1 except for using diallyl ester instead of di(2-ethylhexyl)ester. The diallyl ester was a mixture of diallyl maleate and diallyl fumarate in a weight ratio of 90:10.

Comparative Example 8

A vinyl chloride-based polymer was produced by the same method described in Example 12 except for not using di(2-ethylhexyl)ester.

Experimental Example 1

In order to comparatively analyze physical properties with respect to the vinyl chloride polymers prepared in Examples 1 to 15 and Comparative Examples 1 to 8, apparent specific gravity, average diameter and particle size distribution degree were measured for each vinyl chloride polymer, and the results are listed in Table 1 below.

The apparent specific gravity was measured based on ASTM D1 895-89 standard.

The average particle diameter and the particle size distribution degree were measured based on ASTM D1 705 standard. The average particle diameter was weight average particle diameter obtained by the standard, and the particle size distribution degree was obtained from the remaining amount not passing through a 200 mesh with respect to the entire specimen used for the measurement in a wt % ratio.

TABLE 1

| Division | Apparent specific gravity (g/cc) | Average particle diameter (μm) | Particle size distribution degree (%) |
| --- | --- | --- | --- |
| Example 1 | 0.531 | 144 | 0.9 |
| Example 2 | 0.536 | 137 | 0.8 |
| Example 3 | 0.535 | 138 | 0.7 |
| Example 4 | 0.538 | 141 | 0.8 |
| Example 5 | 0.549 | 143 | 1.2 |
| Example 6 | 0.535 | 139 | 0.8 |
| Example 7 | 0.534 | 144 | 0.7 |
| Example 8 | 0.537 | 145 | 0.7 |
| Example 9 | 0.536 | 137 | 0.8 |
| Example 10 | 0.536 | 136 | 0.9 |
| Example 11 | 0.538 | 141 | 0.8 |
| Example 12 | 0.578 | 141 | 1.0 |
| Example 13 | 0.576 | 139 | 1.1 |
| Example 14 | 0.579 | 140 | 1.1 |
| Example 15 | 0.579 | 138 | 1.2 |
| Comparative Example 1 | 0.532 | 145 | 0.7 |
| Comparative Example 2 | 0.532 | 146 | 0.8 |
| Comparative Example 3 | 0.535 | 134 | 1.0 |
| Comparative Example 4 | 0.516 | 137 | 1.4 |
| Comparative Example 5 | 0.540 | 143 | 1.0 |
| Comparative Example 6 | 0.535 | 142 | 2.5 |
| Comparative Example 7 | 0.545 | 149 | 0.8 |
| Comparative Example 8 | 0.574 | 140 | 1.1 |

As shown in Table 1, the vinyl chloride polymers of Examples 1 to 11 and the vinyl chloride polymers of Examples 12 to 15 according to exemplary embodiments of the present invention exhibited similar particle properties, in general, as the vinyl chloride polymers of Comparative Examples 1 and 8, which were prepared to the same polymerization degrees, respectively. On the contrary, the vinyl chloride polymers of Comparative Examples 3 to 7 exhibited changed particle properties when compared to the vinyl chloride polymer of Comparative Example 1, which was prepared to the same polymerization degree. Particularly, the vinyl chloride polymers of Comparative Example 4, Comparative Example 6, and Comparative Example 7 exhibited considerably changed particle properties when compared to the vinyl chloride polymer of Comparative Example 1.

The results mean that the vinyl chloride polymers of Examples 1 to 15 according to exemplary embodiments of the present invention include a specific amount of an unsaturated fatty acid ester in which cis- and trans-isomers are present at a specific weight ratio, and particle properties inherent in a common vinyl chloride polymer are not changed.

Experimental Example 2

In order to comparatively analyze physical properties of thermoplastic resin molded articles using the vinyl chloride-based polymers prepared in Examples 1 to 15, and Comparative Examples 1 to 8, a thermoplastic resin composition including each vinyl chloride polymer was prepared and a molded article was manufactured using thereof. Then, the generation degree of fish-eyes, transparency and impact strength were measured, and the results are listed in Table 2 below.

1) Generation Degree of Fish-Eyes 45 parts by weight of dioctyl phthalate (DOP), 0.1 parts by weight of barium stearate, a tin-based thermal stabilizer (MT800, Songwon Industrial Co., Ltd.), and 0.1 parts by weight of carbon black were added to 100 parts by weight of each of the vinyl chloride polymers prepared in Examples 1 to 15 and Comparative Examples 1 to 8 to produce a thermoplastic resin composition. Then, each composition was mixed and kneaded using a 6-inch roll of 145° C. for 5 minutes to manufacture a sheet with a thickness of 0.3 mm. In each sheet, the number of white and transparent particles in an area of 400 cm$^2$ was measured.

2) Evaluation of Transparency 4 parts by weight of a tin-based thermal stabilizer (MT800, Songwon Industrial Co., Ltd.), 1 part by weight of a processing auxiliary (PA-910, LG Chem. Ltd.), 5 parts by weight of an impact reinforcing agent (MB872, LG Chem. Ltd.), and 0.5 parts by weight of a lubricant (SL63, LG Chem. Ltd.) were added to 100 parts by weight of each of the vinyl chloride polymers prepared in Examples 1 to 15 and Comparative Examples 1 to 8 and kneaded at 185° C. using a roll-mill for 3 minutes to manufacture a sheet with a thickness of 0.5 mm. Each sheet thus manufactured was cut to a predetermined size, then was put into a frame with a thickness of 3 cm, and using a press, pre-heated at 185° C. for 2 minutes, heated at a low pressure for 3 minutes and cooled at a high pressure for 2 minutes to manufacture each compressed sheet. Transparency was measured for each compressed sheet using a haze-gard plus instrument (BYK-Gardener). The higher the transparency value is, the better the product is.

3) Measurement of Impact Strength 4 parts by weight of a tin-based thermal stabilizer (MT80, Songwon Industrial Co., Ltd.), 1 part by weight of a stearate-based lubricant (SL29, Songwon Industrial Co., Ltd.), 1.5 parts by weight of a processing auxiliary (PA-828, LG Chem. Ltd.), and 6 parts by weight of an impact reinforcing agent (MB872, LG Chem. Ltd.) were added to 100 parts by weight of each of the vinyl chloride polymers prepared in Examples 1 to 15 and Comparative Examples 1 to 8 and calendering was performed at 185° C. for 5 minutes using a roll. Compressed sheets were manufactured via press molding, and impact strength was measured based on ASTM D256.

TABLE 2

| Division | Fish-eyes (number) | Transparency | Impact strength (kgfcm/cm$^2$) |
| --- | --- | --- | --- |
| Example 1 | 10 | 77.3 | 33 |
| Example 2 | 3 | 78.3 | 37 |
| Example 3 | 2 | 78.6 | 42 |
| Example 4 | 7 | 77.3 | 36 |
| Example 5 | 9 | 78.5 | 37 |
| Example 6 | 3 | 78.4 | 38 |
| Example 7 | 6 | 78.1 | 35 |
| Example 8 | 7 | 78.0 | 34 |
| Example 9 | 4 | 78.3 | 37 |
| Example 10 | 3 | 78.9 | 40 |
| Example 11 | 7 | 79.2 | 40 |

TABLE 2-continued

| Division | Fish-eyes (number) | Transparency | Impact strength (kgfcm/cm²) |
|---|---|---|---|
| Example 12 | 12 | 76.8 | 32 |
| Example 13 | 7 | 77.2 | 34 |
| Example 14 | 8 | 77.4 | 35 |
| Example 15 | 9 | 77.5 | 34 |
| Comparative Example 1 | 12 | 76.1 | 32 |
| Comparative Example 2 | 12 | 76.4 | 31 |
| Comparative Example 3 | 4 | 77.5 | 26 |
| Comparative Example 4 | 13 | 75.2 | 29 |
| Comparative Example 5 | 8 | 73.1 | 36 |
| Comparative Example 6 | 14 | 74.5 | 28 |
| Comparative Example 7 | 19 | 74.1 | 27 |
| Comparative Example 8 | 15 | 75.7 | 30 |

As shown in Table 2, each molded article manufactured by using the vinyl chloride polymers of Examples 1 to 15 according to exemplary embodiments of the present invention exhibited similar or better transparency and impact strength and decreased generation of fish-eyes, in general, when compared to each molded article manufactured by using the vinyl chloride polymer of Comparative Examples 1 to 8.

In particular, the vinyl chloride polymer of Comparative Example 1, which did not include an unsaturated fatty acid ester, exhibited somewhat decreased transparency, markedly increased number of fish-eyes by 120%, and decreased impact strength by about 4% when compared to the vinyl chloride polymer of Example 1, which was produced under the same conditions except for the inclusion or exclusion of an unsaturated fatty acid ester. In addition, when comparing the vinyl chloride polymers of Example 12 and Comparative Example 8, which were produced under the same conditions except for the inclusion or exclusion of an unsaturated fatty acid ester, the vinyl chloride polymer of Comparative Example 8 exhibited somewhat decreased transparency, markedly increased number of fish-eyes by 125%, and decreased impact strength by about 6% when compared to the vinyl chloride polymer of Example 12.

Also, the vinyl chloride polymers including an unsaturated fatty acid ester in a deviated amount range from the suggested amount range in the present invention according to Comparative Example 2 (about 0.0008 parts by weight) and Comparative Example 3 (2.5 parts by weight), exhibited somewhat decreased transparency, increased number of fish-eyes by 120% and 200%, respectively, and markedly decreased impact strength to the degrees of 94% and 62%, respectively when compared to the vinyl chloride-based polymers of Examples 1 and 3.

In addition, the vinyl chloride polymer in which an unsaturated fatty acid ester was included in an amount range suggested in the present invention but the ratio of a cis-isomer was excessively large in the weight ratio of a cis-isomer and a trans-isomer according to Comparative Example 4 (cis-isomer:trans-isomer=95:5), exhibited decreased transparency, increased number of fish-eyes by 130%, and markedly decreased impact strength to 79% degree when compared to the vinyl chloride polymer of Example 1. The vinyl chloride polymer in which an unsaturated fatty acid ester was included in an amount range suggested in the present invention but the ratio of a cis-isomer and a trans-isomer was the same in the weight ratio of a cis-isomer and a trans-isomer according to Comparative Example 5 (cis-isomer:trans-isomer=50:50), exhibited similar or somewhat decreased number of fish-eyes and impact strength, and decreased transparency to 93% degree when compared to the vinyl chloride polymer of Example 5.

Also, the vinyl chloride polymer of Comparative Example 6, which included an unsaturated fatty acid ester having a deviated carbon number from that suggested in the present invention exhibited decreased transparency to 95% degree, increased number of fish-eyes by about 5 times, and markedly decreased impact strength to 74% degree when compared to the vinyl chloride polymer of Example 6. In addition, the vinyl chloride polymer of Comparative Example 7, which included a diallyl ester instead of an unsaturated fatty acid ester suggested in the present invention, exhibited decreased transparency to 96% degree, rapidly increased number of fish-eyes by about 2 times, and markedly decreased impact strength to 82% degree when compared to the vinyl chloride polymer of Example 1.

According to the results of Experimental Example 1 and Experimental Example 2, the vinyl chloride polymer according to an embodiment of the present invention may have similar particle properties as a common vinyl chloride polymer by including a specific amount range of an unsaturated fatty acid ester in which a cis-isomer and a trans-isomer are mixed in a specific weight ratio, and thus, impact strength properties of a common vinyl chloride polymer may not be deteriorated, the effect of an inherent plasticizer may be attained to improve processability, and the appearance characteristics of a molded article (for example, decrease of the number of fish-eyes, increase of transparency, etc.) may be improved.

The invention claimed is:

1. A vinyl chloride-based polymer containing 0.001 parts by weight or more and less than 2 parts by weight of an unsaturated fatty acid ester on the basis of 100 parts by weight of the vinyl chloride-based polymer,
    wherein the vinyl chloride-based polymer comprises a vinyl chloride-based monomer and the unsaturated fatty acid ester,
    wherein the vinyl chloride-based monomer is a vinyl chloride monomer alone, or a combination of a vinyl chloride monomer and a comonomer copolymerizable therewith,
    wherein the comonomer is a vinyl-based monomer,
    wherein the unsaturated fatty acid ester includes cis- and trans-isomers of the unsaturated fatty acid ester, and
    wherein the weight ratio between the cis- and trans-isomers of the unsaturated fatty acid ester is 60:40 to 90:10.

2. The vinyl chloride-based polymer of claim 1, wherein the weight ratio between the cis- and trans-isomers of unsaturated fatty acid ester is 65:35 to 80:20.

3. The vinyl chloride-based polymer of claim 1, wherein the cis-isomer of unsaturated fatty acid ester is a compound represented by Formula 1, and the trans isomer of the unsaturated fatty acid ester is a compound represented by Formula 2:

[Formula 1]

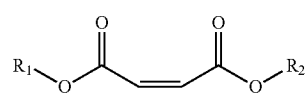

-continued

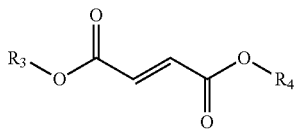
[Formula 2]

In Formulas 1 and 2, $R_1$ to $R_4$ are each independently selected from the group consisting of an alkyl group having 2 to 16 carbon atoms, a cycloalkyl group having 3 to 16 carbon atoms, and a combination thereof.

4. The vinyl chloride-based polymer of claim 3, wherein $R_1$ to $R_4$ in Formula 1 and 2 are each independently a linear or branched alkyl group having 4 to 14 carbon atoms.

5. A method for preparing the vinyl chloride-based polymer of claim 1, the method comprising:
adding an unsaturated fatty acid ester to a vinyl chloride-based monomer in the presence of a polymerization initiator and a protective colloid auxiliary and performing suspension polymerization,
wherein the vinyl chloride-based monomer is a vinyl chloride monomer alone, or a combination of a vinyl chloride monomer and a vinyl-based monomer copolymerizable therewith,
wherein the unsaturated fatty acid ester is batch-added, continuously added, or added in at least two installments, in a range in which a polymerization conversion rate of the vinyl chloride-based monomer is 85% or less,
wherein the unsaturated fatty acid ester is added in an amount of 0.001 parts by weight or more and less than 2 parts by weight on the basis of 100 parts by weight of the vinyl chloride-based monomer,
wherein the unsaturated fatty acid ester includes cis- and trans-isomers of unsaturated fatty acid ester, and
the weight ratio between the cis- and trans-isomers of unsaturated fatty acid ester is 60:40 to 90:10.

6. The method of claim 5, wherein, when batch-added, the total amount of the unsaturated fatty acid ester is added at a time in a range in which the polymerization conversion rate of the vinyl chloride-based monomer is 60% or less.

7. The method of claim 5, wherein, when continuously added, the unsaturated fatty acid ester is added starting at the time when the polymerization conversion rate of the vinyl chloride-based monomer is 1% or more and ending at the time when the polymerization conversion rate is 85% or less, and
the total amount of the unsaturated fatty acid ester is added at a constant rate from the starting to the ending of the addition.

8. The method of claim 5, wherein, when continuously added, the unsaturated fatty acid ester is added starting at the time when the polymerization conversion rate is 10% or more and ending at the time when the polymerization conversion rate is 35% or less, and
the total amount of the unsaturated fatty acid ester is added at a constant rate from the starting to the ending of the addition.

9. The method of claim 5, wherein the addition in installments is continuous addition in installments or batch addition in installments.

10. The method of claim 9, wherein the batch addition in installments comprises first batch adding of a first fraction of the total amount of the unsaturated fatty acid ester at the time when the polymerization conversion rate is 1 to 30%, and second batch adding of the remaining second fraction excluding the first fraction of the total amount at the time when the polymerization conversion rate is 35 to 85%.

11. The method of claim 9, wherein the batch addition in installments comprises first batch adding of a first fraction of the total amount of the unsaturated fatty acid ester at the time when the polymerization conversion rate is 10 to 30%, second batch adding of a second fraction of the total amount at the time when the polymerization conversion rate is 35 to 50%, and third batch adding of the remaining third fraction excluding the first and second fractions of the total amount at the time when the polymerization conversion rate is 55 to 85%.

12. The method of claim 9, wherein the continuous addition in installments comprises first continuous adding of a first fraction of the total amount of the unsaturated fatty acid ester starting at the time when the polymerization conversion rate is 1% or more and ending at the time when the polymerization conversion rate is 25% or less, and second continuous adding of the remaining second fraction excluding the first fraction of the total amount starting at the time when the polymerization conversion rate is 35% or more and ending at the time when the polymerization conversion rate is 60% or less, and
the first continuous adding and the second continuous adding of the unsaturated fatty acid ester are performed at a constant rate from the starting to the ending of the respective addition.

13. The method of claim 9, wherein the continuous addition in installments comprises first continuous adding of a first fraction of the total amount of the unsaturated fatty acid ester starting at the time when the polymerization conversion rate is 1% or more and ending at the time when the polymerization conversion rate is 25% or less, second continuous adding of a second fraction of the total amount starting at the time when the polymerization conversion rate is 30% or more and ending at the time when the polymerization conversion rate is 50% or less, and third continuous adding of the remaining third fraction excluding the first and second fractions of the total amount starting at the time when the polymerization conversion rate is 55% or more and ending at the time when the polymerization conversion rate is 70% or less, and
the first continuous addition, the second continuous addition, and the third continuous addition of the unsaturated fatty acid ester are performed at a constant rate from the starting to the ending of the respective addition.

14. The method of claim 5, wherein the cis-isomer of unsaturated fatty acid ester is a compound represented by Formula 1, and the trans isomer of the unsaturated fatty acid ester is a compound represented by Formula 2:

[Formula 1]

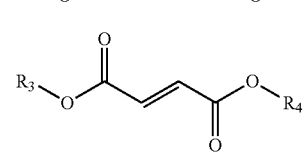
[Formula 2]

In Formulas 1 and 2, $R_1$ to $R_4$ are each independently selected from the group consisting of an alkyl group having 2 to 16 carbon atoms, a cycloalkyl group having 3 to 16 carbon atoms, and a combination thereof.

15. The method of claim 5, wherein the protective colloid auxiliary is at least one selected from the group consisting of a vinyl alcohol-based resin, cellulose and an unsaturated organic acid polymer.

16. The method of claim 5, wherein the protective colloid auxiliary is a mixture of a vinyl alcohol-based resin and cellulose, and the weight ratio between the vinyl alcohol-based resin and the cellulose in the mixture is 5:1 to 9:7.

* * * * *